United States Patent
Broad et al.

(10) Patent No.: US 7,705,729 B2
(45) Date of Patent: Apr. 27, 2010

(54) SURVEILLANCE SYSTEM AND METHOD

(75) Inventors: Alan S. Broad, Palo Alto, CA (US);
Michael A. Horton, Santa Clara, CA (US)

(73) Assignee: MEMSIC, Inc., Andover, MA (US)

( * ) Notice: Subject to any disclaimer, the term of this patent is extended or adjusted under 35 U.S.C. 154(b) by 1172 days.

(21) Appl. No.: 11/095,640

(22) Filed: Mar. 30, 2005

(65) Prior Publication Data

US 2006/0229086 A1 Oct. 12, 2006

Related U.S. Application Data

(63) Continuation-in-part of application No. 11/096,098, filed on Mar. 30, 2005, now Pat. No. 7,369,047.

(51) Int. Cl.
*G08B 13/00* (2006.01)

(52) U.S. Cl. .......... 340/541; 340/539.1; 340/572.1; 340/573.1

(58) Field of Classification Search ............. 340/539.1, 340/572.1, 573.1; 235/375, 385
See application file for complete search history.

(56) References Cited

U.S. PATENT DOCUMENTS

| | | | |
|---|---|---|---|
| 4,002,886 A | | 1/1977 | Sundelin |
| 4,418,333 A | * | 11/1983 | Schwarzbach et al. . 340/310.11 |
| 4,766,295 A | | 8/1988 | Davis et al. |
| 5,352,957 A | * | 10/1994 | Werner ................ 315/291 |
| 5,365,154 A | * | 11/1994 | Schneider et al. ........ 318/103 |
| 5,640,151 A | | 6/1997 | Reis et al. |
| 5,697,061 A | | 12/1997 | Krueger et al. |
| 5,841,365 A | | 11/1998 | Rimkus |
| 5,995,015 A | | 11/1999 | DeTemple et al. |
| 6,032,109 A | | 2/2000 | Ritmiller, III |
| 6,078,269 A | * | 6/2000 | Markwell et al. .......... 340/517 |
| 6,208,247 B1 | * | 3/2001 | Agre et al. ............. 340/539.19 |
| 6,243,654 B1 | | 6/2001 | Johnson et al. |
| 6,381,467 B1 | | 4/2002 | Hill et al. |
| 6,392,562 B1 | | 5/2002 | Boston et al. |
| 6,587,739 B1 | * | 7/2003 | Abrams et al. ............. 700/83 |
| 6,690,289 B1 | * | 2/2004 | Odinak et al. .......... 340/825.52 |
| 6,745,027 B2 | | 6/2004 | Twitchell, Jr. |
| 6,749,116 B2 | | 6/2004 | Massaro |
| 6,750,769 B1 | | 6/2004 | Smith |
| 6,822,568 B2 | * | 11/2004 | Gehlot et al. ............ 340/572.1 |

(Continued)

OTHER PUBLICATIONS

IEEE Instrumentation and Measurement Society, "IEEE Standard for a Smart Transducer Interface for Sensors and Actuators—Transducers to Microprocessor Communication Protocols and Transducers Electronic Data Sheet (TEDS) Formats", IEEE Std. 1451.2-1997, 1998, The Institute of Electrical and Electronics Engineers, Inc., 125 Pages.

(Continued)

*Primary Examiner*—Eric M Blount
(74) *Attorney, Agent, or Firm*—Fenwick & West LLP

(57) ABSTRACT

A plurality of modules interact to form an adaptive network in which each module transmits and receives data signals indicative of proximity of objects. A central computer accumulates the data produced or received and relayed by each module for analyzing proximity responses to transmit through the adaptive network control signals to a selectively-addressed module to respond to computer analyses of the data accumulated from modules forming the adaptive network.

4 Claims, 4 Drawing Sheets

U.S. PATENT DOCUMENTS

| | | | |
|---|---|---|---|
| 6,844,821 B2 | 1/2005 | Swartzel et al. | |
| 6,859,831 B1 * | 2/2005 | Gelvin et al. | 340/539.19 |
| 6,961,709 B2 | 11/2005 | Goodwin, III | |
| 7,035,240 B1 | 4/2006 | Balakrishnan et al. | |
| 7,090,125 B2 | 8/2006 | Goel et al. | |
| 7,103,511 B2 * | 9/2006 | Petite | 702/188 |
| 7,152,040 B1 | 12/2006 | Hawthorne et al. | |
| 7,176,808 B1 | 2/2007 | Broad et al. | |
| 7,231,180 B2 * | 6/2007 | Benson et al. | 455/41.2 |
| 7,360,095 B2 * | 4/2008 | Girouard et al. | 340/505 |
| 7,369,047 B2 | 5/2008 | Broad et al. | |
| 7,397,368 B2 * | 7/2008 | Otto et al. | 340/539.22 |
| 7,424,527 B2 * | 9/2008 | Petite | 340/539.22 |
| 7,429,936 B2 * | 9/2008 | Paradiso et al. | 340/988 |
| 7,440,735 B2 * | 10/2008 | Karschnia et al. | 340/3.1 |
| 2003/0025599 A1 * | 2/2003 | Monroe | 340/531 |
| 2003/0043028 A1 * | 3/2003 | Torikai et al. | 340/310.01 |
| 2003/0063585 A1 | 4/2003 | Younis et al. | |
| 2004/0010492 A1 | 1/2004 | Zhao et al. | |
| 2004/0098218 A1 | 5/2004 | Ito et al. | |
| 2004/0122833 A1 | 6/2004 | Forth et al. | |
| 2005/0218218 A1 | 10/2005 | Koster | |
| 2005/0237153 A1 | 10/2005 | Chen | |
| 2006/0130142 A1 | 6/2006 | Mester et al. | |
| 2006/0176239 A1 | 8/2006 | Sweeney | |
| 2006/0187040 A1 | 8/2006 | Sweeney | |
| 2006/0271667 A1 * | 11/2006 | Clow et al. | 709/223 |

OTHER PUBLICATIONS

IEEE Standards for A Smart Transducer Interface for Sensors and Actuators—Mixed-Mode Communication Protocols and Transducer Electronic Data Sheet (TEDS) Formats, IEEE Standards 1451.4-2004, IEEE Instrumentation and Measurement Society, 2004, 439 Pages.

Crossbow Technology, "Xmesh Network Layer," 2006, 1 page.

* cited by examiner

SURVEILLANCE SYSTEM AND METHOD

RELATED APPLICATION

This application is a continuation-in-part of application Ser. no. 11/096,098, entitled "Adaptive Sensing Network", filed on Mar. 30, 2005 by A. Broad et al., now U.S. Pat. No. 7,369,047, which application is incorporated herein in the entirety by this reference thereto.

FIELD OF THE INVENTION

This invention relates to adaptive networks and more particularly to sensing modules including proximity sensors and transceivers for communicating among adjacent modules in a self-adaptive network array that communicates intrusion information to local or central computers.

BACKGROUND OF THE INVENTION

Certain installations require secure boundaries to preserve integrity or security of the installation against unauthorized intrusions. A store house of strategic materials or a temporary security area around a crime scene, or the like, is commonly marked by fencing or rope or tape borders, or the like, to inhibit further intrusion by unauthorized personnel. However, such factors are not deterrents to individuals who are determined to enter the security area.

Alternatively, more permanent installations commonly include closed-circuit video surveillance of a secured area, with concomitant monitors for security personnel in attendance to observe video images for any changed circumstances. Appropriate alarms and corrective measures may be initiated upon observation of a video image of changed circumstances that prompt human analysis and manual responses. These tactics are commonly expensive for video camera and monitor installations and for continuing labor expenses associated with continuous shifts of attendant personnel.

SUMMARY OF THE INVENTION

In accordance with one embodiment of the present invention, a plurality of individual transceiver modules may be deployed around the perimeter of an installation to be secured in order to sense and transmit information about activity within a vicinity of a transceiver module. Each module is capable of communicating its own sensory data to one or more adjacent modules, and can relay data signals received from one or more adjacent modules to other adjacent modules in the formation of a distributed self-adaptive network that may communicate with a central computer. Such interactions of adjacent modules obviate need for an electromagnetic survey of an area to be secured, and promotes convenient re-structuring of perimeter sensors as desired without complications of re-assembling hard-wired sensors and monitors. In addition, interactions of adjacent modules establish verification of an intrusion event that is distinguishable from false detection events.

DETAILED DESCRIPTION OF THE INVENTION

Figure 1:
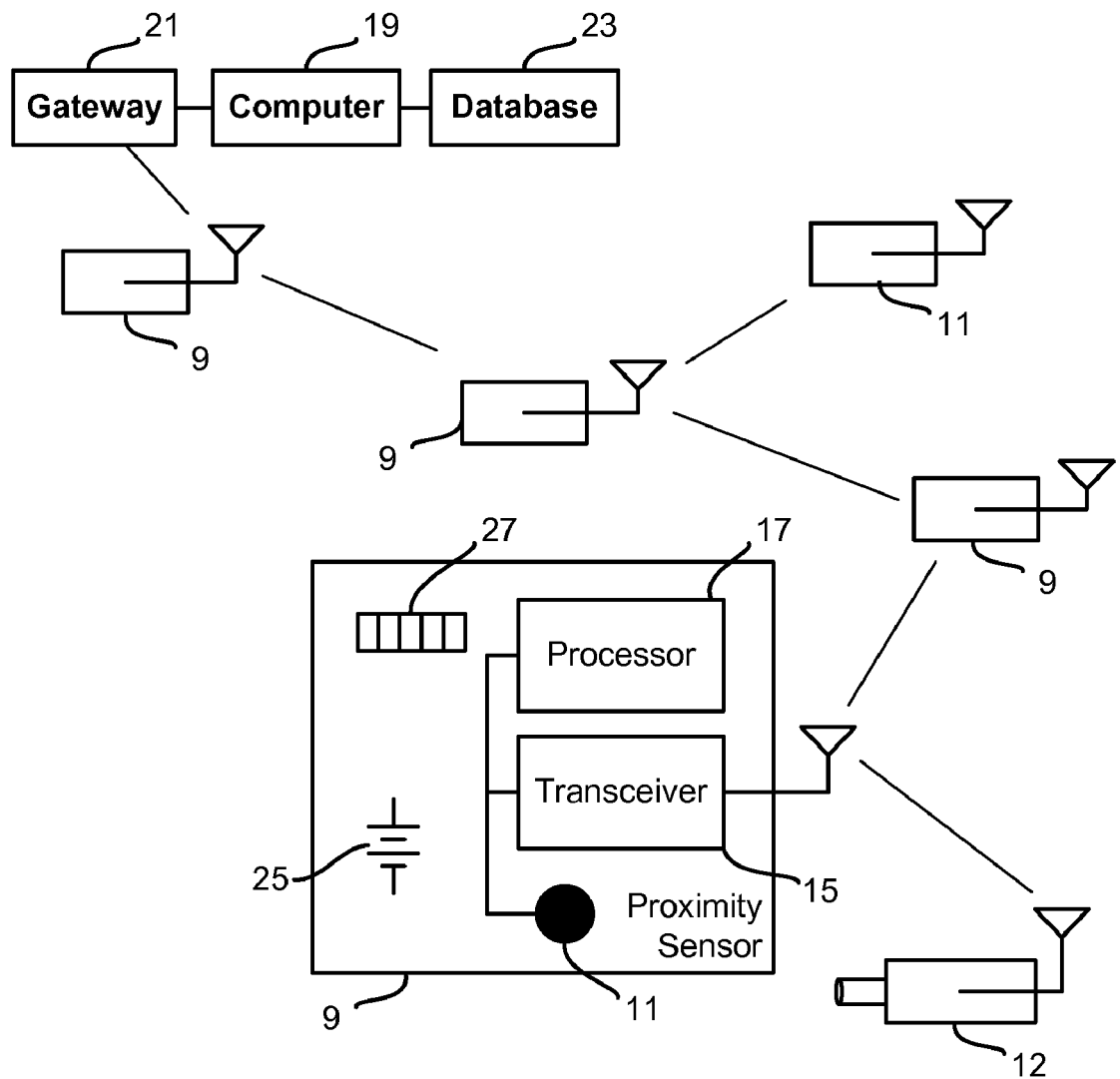
FIG. 1 is a pictorial block diagram of a plurality of sensor modules in accordance with an embodiment of the present invention.

Referring now to FIG. 1, there is shown a plurality of individual sensor modules 9 deployed at spaced locations, for example, along a peripheral boundary of an area to be secured. Of course, additional sensor modules 11 may be deployed along pathways or entryways or other locations within the area to be secured in order to monitor traffic or other activities.

Each sensor monitor 9, 11 includes a proximity sensor 13 that may be, for example, a passive infrared sensor that responds to the presence or proximity of a warm object such as an individual, vehicle, or the like. Alternatively, the proximity sensor 13 may be an active infrared or radio or ultrasonic sensor that emits a signal and senses any echo attributable to presence of a reflective object within a sensing field of view. Of course, other sensors such as vibration detectors or light detectors may be used to respond to the presence of an intruding object.

In addition, each proximity sensor 9 includes a transceiver 15 that responds to radio transmissions from other similar modules, and also transmits radio signals to other modules for reception and relay or re-transmission thereby of such received signals. In this way, an array of modules 9, 11 form an interactive, distributed network that operates self-adaptively on operative modules 9. Thus, if one module 9, 11 is added, removed or is rendered inoperative, then adjacent operative modules 9, 11 are capable of interacting to reconfigure a different distributed array.

Each sensor module 9, 11 also includes a processor 17 that controls operation of the transceiver 15 and proximity sensor 13 to produce data signals for transmission via the transceiver 15 to one or more adjacent modules 9, 11. In addition, the processor 17 may control random recurrences of monitoring events to amass information about any changes in circumstances associated with proximate objects, for conversion to data signals to be transmitted via transceiver 15. Each processor 17 may include alarm utilization circuitry for initiating alarms, commencing video surveillance, or the like, upon sensing a change in proximity circumstances. Alternatively, the distributed network of modules 9, 11 may also communicate with a central computer 19 via a transceiver 21 acting as a gateway between the computer 19 and the distributed array of modules 9, 11 for communicating signals between the computer 19 and the network of interactive modules 9, 11. Computer 19 may operate on a database 23 of address or identification codes for each module 9, 11 in order to communicate through the network of modules 9, 11, that each have different addresses or identification codes, to a particular module having a selected address. In this way, each module 9, 11 may transmit and receive data signals specifically designating the module by its unique identification code or address. And, each module 9, 11 is powered by self-contained batteries 25 and/or photovoltaic cells 27.

The modules 9, 11 may be disposed within conventional traffic-marking cones for convenient mobile placement or may be mounted on fence posts, or may be mounted on spikes driven into the ground within and about an area to be secured, or may be otherwise suitably mounted in, on and about areas or passageways that are to be secured against unauthorized intrusions.

The plurality of modules 9, 11 may interact to distinguish between a false intrusion detection event and a true event for which alarm and other responses should be initiated. Certain proximity sensors such as passive infrared sensors or ultrasonic sensors may respond to a breeze of different temperature, or to objects blowing by in a strong wind and thereby create a false intrusion detection.

In accordance with an embodiment of the present invention, such false intrusion detections are recognized to be predominantly random events attributable to stimulation of one sensor and likely not an adjacent sensor. Thus, correlation of sensor events among multiple adjacent sensors permits discrimination against false intrusion detections. Additional information is extracted throughout the network of multiple sensors, for example, responsive to an entry location and to movement along a path of travel. The additional information including, for example, time and duration and location of one or more sensor stimulations may be transmitted back to the central computer 19 through the network of module's 9, 11 for computerized correlation analysis of the additional information to verify a true intrusion event. Alternatively, modules 9, 11 disposed within or about a small area may communicate the additional information between modules to correlate the sensor stimulations and locally perform computerized correlation analysis within one or more of the processors 17 to verify a true intrusion event.

Additionally, the sensor information derived from a plurality of adjacent or neighboring modules 9, 11 may be analyzed by the central computer 19, or by local processors 17, to triangulate the location and path of movement of an intruder for producing location coordinates to which an installed video surveillance camera may be aligned. Thus, one or more stand-alone, battery-operated video surveillance cameras 12 with different addresses in the network may be selectively activated in an adjacent region only upon true intrusion events in the region for maximum unattended battery operation of the cameras 12. Such cameras 12 of diminutive size and low power consumption (such as commonly incorporated into contemporary cell phones) may operate for brief intervals during a true intrusion event to relay image data through the network of modules 9, 11 for storage in the database 23 along with such additional information as time of intrusion, duration and coordinates along a path of movement through the secured area, and the like.

Figure 2:
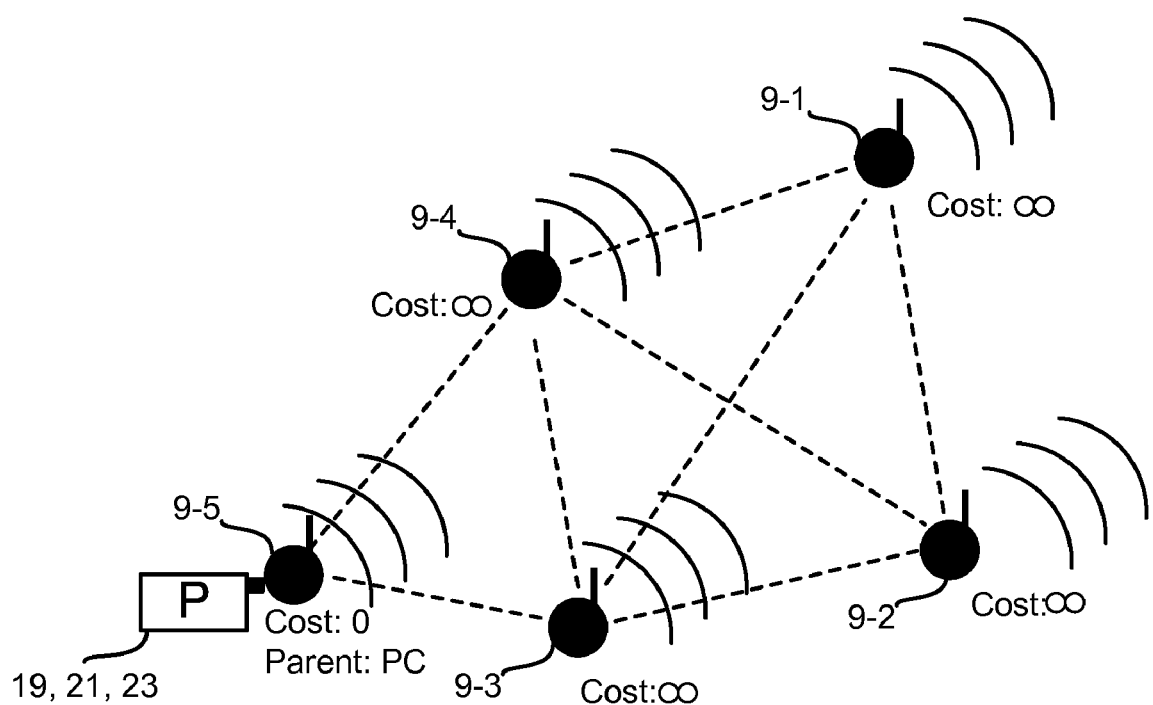
FIG. 2 is a pictorial illustration of an array of spaced modules upon initialization of the adaptive network.

Referring now to the FIG. 2 illustration of a typical network that requires initialization, it may be helpful for understanding the formation of such a network to consider 'cost' as a value or number indicative of the amount of energy required to transmit a message to another receiving module. Higher cost translates, for example, into higher energy consumption from limited battery capacity in each module. In order for an adaptive network to form, a module (9-1 to 9-5) must select a parent or superior node to which to forward messages. The radio transmissions or beacons from neighboring modules (NM) inform a module about how well the NM's can hear its messages which include cost for the NM's to forward a message toward a base station, together with a 'hop' count (i.e., number of repeater or message relay operations) to such base station. This may not be enough information by which a module as a subordinate node can select a parent or superior node since a radio link may be highly asymmetrical on such two-way communications. Thus, a NM may receive clearly from a module but the module may not receive clearly from the NM. Selecting such NM as a parent would result in a poor communication link resulting in many message repeats and acknowledgements at concomitant cost.

However, such a module (9-1 to 9-5) can also overhear a NM's transmissions that include the NM's neighborhood list (NL) as a pre-set maximum number, say 16, of modules from which the NM can receive. For greater numbers of modules, the NM excludes from the NL those modules with poor or lower-quality reception. Thus, if a receiving module does not detect its broadcast address or ID in a potential parent's NL, then that NM will not be selected as a parent. A base station (e.g., 9-5 connected to central computer 19, 21, 23) may be set to accommodate a larger number of modules in its NL to handle more children or subordinate modules for greater prospects of assembling an efficient adaptive network through some selection of modules and relay operations therebetween.

Transmitted messages from a module (9-1 to 9-5) contain several factors, including:

a) cost, as a number to be minimized which indicates to NM's the amount of energy required to transmit to a base station. The cost is a summation of all costs of all 'hops' to the base station (a base station 9-5 has zero cost to forward messages, so its messages are distinctive from messages of possible parent modules); and b) the number of 'hops' to send a message to the base station; and c) a packet sequence number (e.g., 16-bit integer) that is incremented every time a message is transmitted from the base station 9-5 or other module 9-1 to 9-4; and d) a neighborhood list (NL) of all other modules in the vicinity from which the base station or other module can receive, including:

i) the ID of each NM; and ii) a reception estimate of how well a module receives messages from such NM as determined from processing the sequence numbers in such message packets to compute a percent of lost packets.

Therefore, a module (9-1 to 9-5) may calculate a probability factor (PF) of success in transmitting to a possible parent, as:

$$PF=(\% \text{ of module's packets received by } NM) \times (\% \text{ of possible parent's packets received by module}).$$

Each module (9-1 to 9-4) may thus calculate its own cost (OC) of sending a message to the base station (9-5), as:

$$OC = \text{cost of } NM/PF.$$

A module selects lowest OC to sent a message.

As illustrated in FIG. 2, initialization of the network is facilitated by the base station (9-5) broadcasting a message including zero costs. In contrast, messages broadcast by all other modules (9-1 to 9-4) include infinite cost (since not yet determined how to route messages to the base station). And, there are no entries in the NL in initial broadcast messages. Data messages from a module are sent with a broadcast address since no parent has been selected. Modules (e.g., 9-3 and 9-4) that can receive base station messages from module 9-5 containing zero cost information will recognize that they can forward messages to such base station. Then, messages forwarded by modules 9-3 and 9-4 within the reception vicinity of the base station 9-5 enable the base station to assemble and include within their messages a NL of modules (including modules 9-3 and 9-4) that receive the base station messages. And, these modules then include the base station and other NM in their NL within broadcast messages. A parent (e.g., module 9-4) is then selected as a superior node by other modules as subordinate nodes whose messages each change from a broadcast address to the parent's address. The network formation thus propagates across the array to more remote nodes (e.g., modules 9-1 and 9-2) that are not in the reception vicinity of the base station 9-5.

Figure 3:
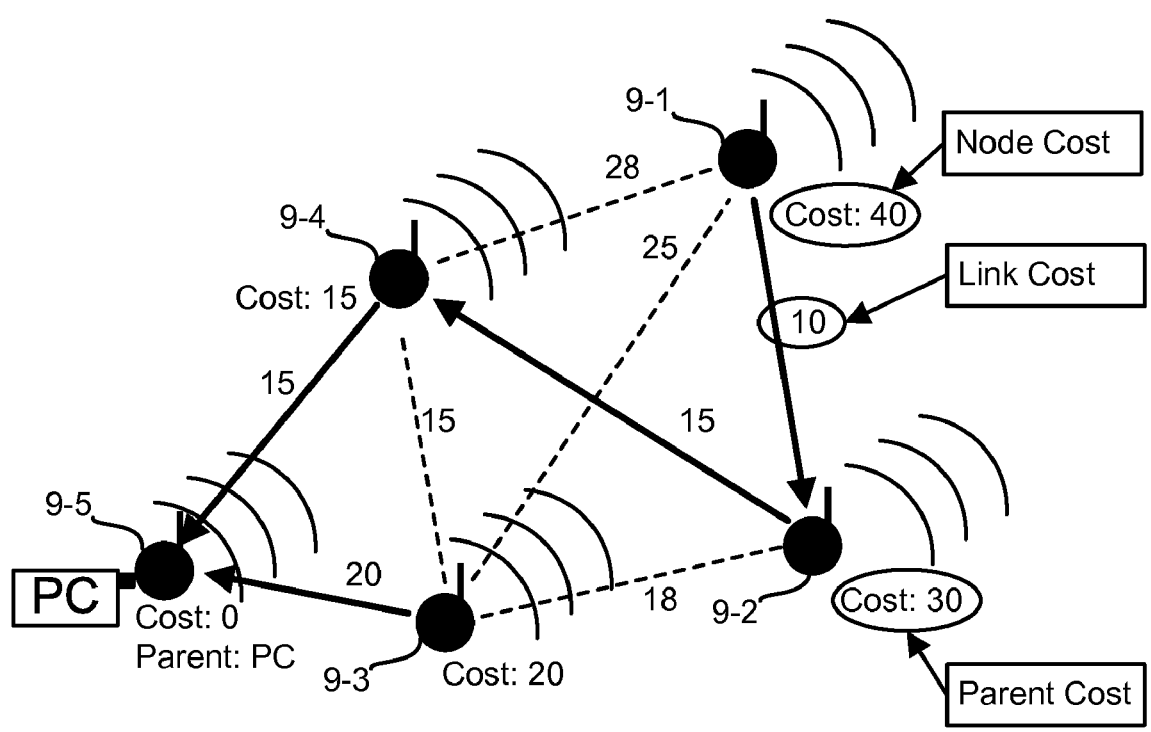
FIG. 3 is a pictorial illustration of the array of FIG. 2 following formation of an interactive network.

Thus, as illustrated in FIG. 3, each module (e.g., module 9-1) may calculate a node cost as the parent's cost plus the cost of the link to the parent (e.g., 9-2). Similarly, each communication link toward the base station (e.g., module 9-5) will be selected by lowest cost (e.g., via module 9-4 rather than via module 9-3) as the network adapts to the existing transmission conditions. In the event the cost parameters change due, for example, to addition or re-location or inoperativeness of a module, then a transmission path to the base station for a remote module will be selected on such lower cost (e.g., from module 9-2 via module 9-3, or from module 9-1 via module 9-4 or 9-3).

Figure 4:
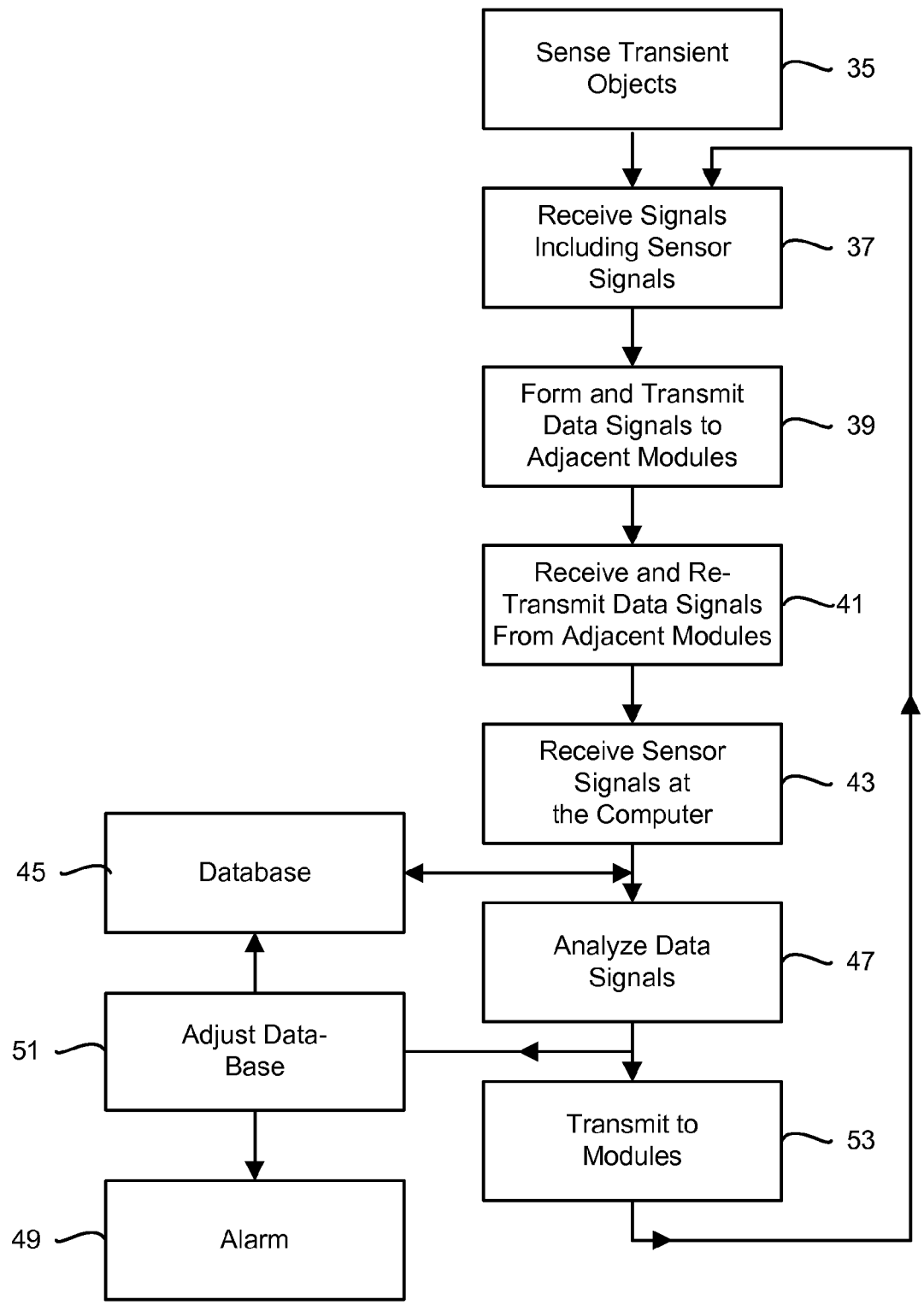
FIG. 4 is a flow chart illustrating an operational embodiment of the present invention.

Referring now to FIG. 4, there is shown a flow chart illustrating one operating embodiment of the present invention in which a proximity-sensing module detects 35 the transient presence of an object. Such detection may be by one or more of passive infrared or acoustic or magnetic sensing, or by active transmission and reception of transmitted and reflected energy. Such proximity sensing may be sampled or swept along all directional axes oriented about the placement of each module. The processor 17 in each module 9, 11 controls operation of the proximity sensor 13 of that module in order to generate data signals for transmission 39 to adjacent modules. The processor 17 may establish sensing intervals independently or in response 37 to transmission thereto (via designated address or identification code) from the central computer 19.

In addition, to transmitting its own generated data signals, a module 9 receives and relays or re-transmits 41 data signals received from adjacent modules in the array of modules 9, 11. Such data signals generated and transmitted or received and re-transmitted by a module among modules are received 43 by the central computer 19 which may analyze 47 the data signals relative to a database 45 of information, for example, regarding conditions about each selected module 9, 11 to trigger alarm conditions 49, or adjust 51 the database, or transmit 53 data or command signals to all or selected, addressed modules 9, 11, 12. Computer analysis of data signals from adjacent addressed modules 9, 11 may profile the characteristics of changed circumstances in the vicinity of the addressed modules, and may identify an intruding object from database information on profiles and characteristics of various objects such as individuals, vehicles, and the like. The processor 7 of each module may include an output utilization circuit for controlling initialization of alarm conditions, or video surveillance of the vicinity, or the like. In addition, alarm utilization 49 determined from analyses of received data signals by the central computer 19 may facilitate triangulating to coordinates of the intrusion locations and along paths of movement for controlling camera 12 surveillance, and may also actuate overall alarm responses concerning the entire secured area.

Therefore, the deployable sensor modules and the self-adaptive networks formed thereby greatly facilitate establishing perimeter surveillance within and around a secure area without time-consuming and expensive requirements of hard-wiring of modules to a central computer. In addition, data signals generated by, or received from other adjacent modules and re-transmitted among adjacent modules promotes self-adaptive formation of distributed sensing networks that can self configure around blocked or inoperative modules to preserve integrity of a secure perimeter established by interactive sensing modules.

What is claimed is:

1. A method for relaying data from a source to a destination via a network of adaptive modules, at least part of the adaptive modules operating with constrained energy sources, the method comprising:

at a first module of the network, selecting a second module of the network to receive the data from the first module based on least amount of energy consumed by a subset of the adaptive modules in the network for wirelessly transmitting the data from the first module to the destination via the second module, wherein selecting the second module comprises computing a probability factor representing likelihood of successful transmission from the first module to the second module, the consumed energy computed based on the probability factor;

at the first module, transmitting the data to the second module via wireless communication, the second module transmitting the data to the destination or a third module of the network; and at the first module, receiving messages from a plurality of the adaptive modules in the network via wireless communication, each message including information representing an amount of energy for transmitting the data to the target module via a module transmitting the message.

2. The method of claim 1, wherein the probability factor is computed based on a percentage of a plurality number of packets that were previously transmitted successfully from the first module to the second module.

3. A first module in a computer-controlled network of adaptive modules for relaying data from a source to a destination, comprising:

a processor configured to select a second module of the network to receive the data from the first module based on least amount of energy consumed by a subset of the adaptive modules in the network to wirelessly transmit the data from the first module to the destination via the second module, wherein the processor is configured to select the second module by computing a probability factor representing likelihood of successful transmission from the first module to the second module, the processor configured to compute the consumed energy based on the probability factor; and a transceiver configured to transmit the data to the selected second module.

4. The first module of claim 3, wherein the processor is further configured to compute the probability factor based on a percentage of a plurality number of packets that were previously transmitted successfully from the first module to the second module.

* * * * *